(12) United States Patent
Knespel et al.

(10) Patent No.: US 7,339,514 B2
(45) Date of Patent: Mar. 4, 2008

(54) REMOTE CONTROL TRANSMITS XML-DOCUMENT

(75) Inventors: Martin Knespel, Vienna (AT); Adolf Proidl, Vessem (NL)

(73) Assignee: Koninklijke Philips Electronics, N.V., Eindhoven (NL)

( * ) Notice: Subject to any disclaimer, the term of this patent is extended or adjusted under 35 U.S.C. 154(b) by 141 days.

(21) Appl. No.: 10/571,807

(22) PCT Filed: Sep. 14, 2004

(86) PCT No.: PCT/IB2004/051752

§ 371 (c)(1),
(2), (4) Date: Mar. 15, 2006

(87) PCT Pub. No.: WO2005/027361

PCT Pub. Date: Mar. 24, 2005

(65) Prior Publication Data

US 2007/0083636 A1    Apr. 12, 2007

(30) Foreign Application Priority Data

Sep. 17, 2003 (EP) .................................. 03103419
Sep. 17, 2003 (EP) .................................. 03103420

(51) Int. Cl.
 *G08C 19/12* (2006.01)
(52) U.S. Cl. ................. 341/176; 340/825.69; 708/131; 708/144
(58) Field of Classification Search ................ 341/176; 340/825.69; 708/131, 144
See application file for complete search history.

(56) References Cited

U.S. PATENT DOCUMENTS

| 6,774,813 | B2* | 8/2004 | van Ee et al. | .......... 340/825.69 |
| 2003/0034957 | A1* | 2/2003 | Dubil et al. | ................ 345/158 |
| 2004/0148637 | A1* | 7/2004 | Sterkin et al. | .............. 725/115 |

* cited by examiner

Primary Examiner—Timothy Edwards, Jr.

(57) ABSTRACT

A remote control (3, 4) for controlling source devices (PC, DVD, RADIO, MP3, TV1, TV2) and playback devices (B1, B2, TV1, TV2, M) sends a command document (DOC) containing a control command (SB) in the form of text to the source device (PC, DVD, RADIO, MP3, TV1, TV2) or playback device (B1, B2, TV1, TV2, M) to be controlled, with the result that a user-friendly matching of the control commands (SB) and a decoding of control commands (SB) is rendered possible in a plurality of devices.

13 Claims, 3 Drawing Sheets

REMOTE CONTROL TRANSMITS XML-DOCUMENT

The invention relates to a control device for controlling at least one device having input means for manual entering of input information associated with a control command for controlling the at least one device and having processing means for encoding the entered input information and for outputting transmission information and having transmission means for transmitting the transmission information in accordance with a transmission method to transmission means of the device in order to activate the control command in the device.

The invention relates further to a system for controlling at least one device by means of at least one control device, wherein the control device comprises input means for manual entering of input information associated with a control command for controlling the at least one device, and processing means for encoding the entered input information and for outputting transmission information, and transmission means for transmitting the transmission information in accordance with a transmission method to transmission means of the device in order to activate the control command in the device.

The invention relates further to a control method for controlling at least one device by means of at least one control device, wherein the following steps are executed:

manual entering of input information associated with a control command at the control device for controlling the at least one device;

encoding of the entered input information and outputting of transmission information;

transmission of the transmission information in accordance with a transmission method to transmission means of the device in order to activate the control command in the device.

Such a control device, such a system and such a method are known from the document WO 00/77759. The control device disclosed therein is formed by a remote control that is designed to control a plurality of devices (DVD-player, VCR, CD-player). The remote control comprises a keypad, which forms input means and with which a user is able to enter a control command by operating a key. Such a control command can be, for example, the control command "PLAY", in order to control the DVD-player in playback mode. To do this, the user operates the key assigned to the "PLAY" control command, the key thereupon emitting input information identifying the key.

Memory means of the known remote control store control codes associated with enterable input information, which in the device to be controlled identify the control command. Encoding means of the remote control determine the control codes and supply transmission information, in which process initialization bits and optionally redundancy bits are inserted. Transmission means of the known remote control are formed by an infrared transmitter and transmit the transmission information as an infrared signal to a remote control interface device. The remote control interface device is connected by way of an IEEE 1394 data bus with the devices to be controlled and activates execution of the control command in the desired device.

In the case of the known remote control, it has proved a disadvantage that the control codes stored in the memory means are set by the particular manufacturer of the device to be controlled. Since there are very many manufacturers and accompanying control codes, it is virtually impossible to store in a single remote control all the control codes for controlling all the commercially available devices, which is why so-called universal remote controls have been introduced to the market; during an initialization procedure, these store in their memory means the control codes of the user's devices to be controlled.

In the case of the known remote control, it has furthermore proved a disadvantage that the encoding means encode the control command to be transmitted in dependence on the transmission method (e.g. infrared transmission method). The known remote control interface device therefore has to decode the received control command encoded in accordance with manufacturer X for the infrared transmission method and encode it in accordance with the encoding method provided for the IEEE 1394 transmission method, in order to control devices connected to the data bus corresponding to the received control command.

It is an object of the invention to produce a control device corresponding to the type specified in the first paragraph, a system corresponding to the type specified in the second paragraph and a control method corresponding to the type specified in the third paragraph, in which, independently of the manufacturer of the devices, the transmission information in all devices is processable. Furthermore, unnecessary encoding and decoding steps in the transmission of a control command are to be avoided. To achieve the above-specified object, provision is made in such a control device for the processing means to comprise command-encoding means for encoding the entered input information in accordance with a command-encoding method independent of the transmission method, wherein a command document is determined as transmission information, which command document contains, in the form of text editable with a text editor, a control command associated with the entered input information.

To achieve the above-specified object, provision is made in such a system for the processing means to comprise command-encoding means for encoding the entered input information in accordance with a command-encoding method independent of the transmission method, wherein a command document is determined as transmission information, which command document contains, in the form of text editable with a text editor, a control command associated with the entered input information, and for the at least one device to comprise command-decoding means for decoding the command document in order to activate the control command in the device.

To achieve the above-specified object, in such a control method the following further steps are executed:

encoding the entered input information in accordance with a command-encoding method independent of the transmission method, wherein a command document is determined as transmission information, which command document contains, in the form of text editable with a text editor, a control command associated with the entered input information;

decoding the command document in the device in order to activate the control command.

Through the features according to the invention, the control device transmits the control command in the form of text, which can be evaluated by transmission means in the device to be controlled or by transmission means in a remote control interface device in order to activate the control command. This provides the great advantage that this text (e.g. PLAY or CHANNEL UP) is common for control commands in the case of virtually all manufacturers—like a standard—and thus can be interpreted spanning manufacturers. The advantage is furthermore obtained that the command document is independent of the chosen transmission method or methods, and consequently the control information does not have to be decoded and subsequently re-encoded on transition from one transmission method to another.

In accordance with the features of claims 2, 9 and 12, the advantage is obtained that XML-documents, for transmission of contents for playback, are customary and are also suitable for transmission in accordance with the invention of control commands by means of a remote control, and hence the same devices (SW and HW) can be used for receiving and interpreting control commands.

In accordance with the features of claims 3, 10 and 13, the advantage is obtained that a transmission via a WLAN is possible over relatively long distances even without line-of-sight contact, thus allowing control of devices throughout the house.

In accordance with the features of claim 4, the advantage is obtained that a user can change, for example, by means of a computer, the allocation stored in the memory means of input information to a control command. Likewise, for each item of input information is it even possible to store in the memory means an entire associated document, which the user could change by means of a computer, in order in this way to change the contents of the keys of the keypad with one or more control commands.

In accordance with the features of claim 5, the advantage is obtained that the document also contains choice information for which device the transmitted control command is provided for.

In accordance with the features of claim 6, the advantage is obtained that the device to be controlled is able to identify the control device that permits personalized functions.

In accordance with the features of claim 7, the advantage is obtained that the command document for the control command "PLAY" can contain the control command in several languages (e.g. "PLAY", "WIEDERGABE", ... ) and hence the interpretation of the command document can be effected not only independently of the manufacturer but also for several languages.

These and other aspects of the invention are apparent from and will be elucidated with reference to the embodiment described hereinafter, to which the invention is not restricted however.

Figure 1:
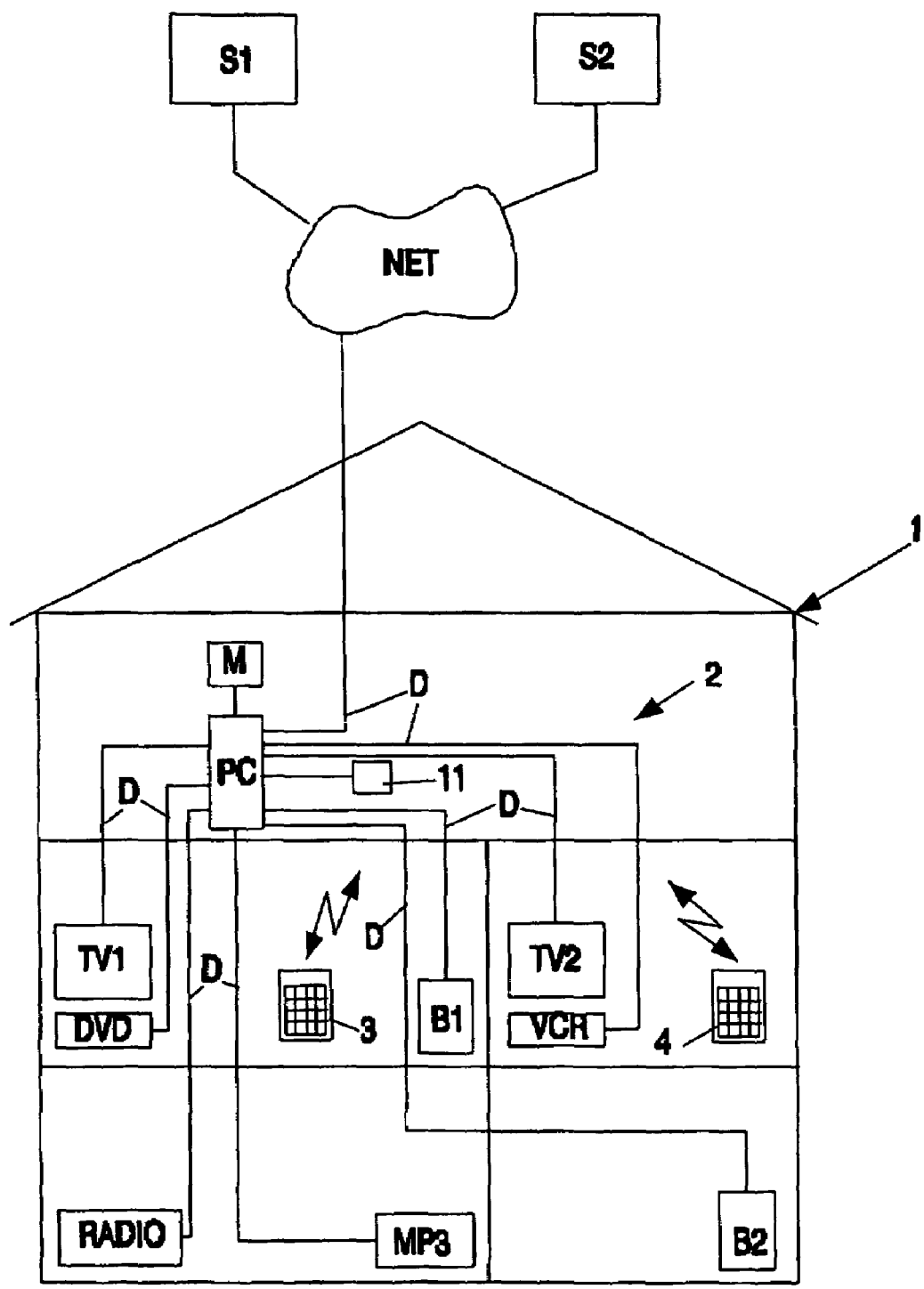
FIG. 1 shows a system having several devices that are controlled by a first remote control and a second remote control, each of which forms a control device.

FIG. 1 shows schematically a house 1 in which a system 2 having a first remote control 3 and a second remote control 4 is provided, the remote controls 3 and 4 forming control devices and being provided for control of a plurality of source devices and playback devices in the house 1. A source device or source shall be understood here to mean a computer PC, a DVD-player DVD, a radio RADIO, an MP3-player MP3 as well as a first television set TV1 and a second television set TV2. A source device serves as information source and outputs information (audio, video or data) via data links D to playback devices. Furthermore, the computer PC is connected to the internet NET and is designed to receive, via the internet NET, information from a first server S1 and a second server S2, which also form source devices of the system 1.

An audio speaker box pair B1, an audio speaker box pair B2, the first television set TV1, the second television set TV2 and the monitor M are to be understood here as playback device or renderer. A playback device is designed for audio and/or visual playback of information that is supplied from the source device via the active data link D to the playback device.

A respective active data link D can be established by means of the first remote control 3 and the second remote control 4, an active data link D connecting a source device that is active for that purpose and one or more playback devices. As soon as an active data link D has been established with the first remote control 3 or the second remote control 4, all further control commands SB relate exclusively to the active source device and playback devices connected with the respective active data link D. To make this possible, each remote control 3 and 4 is distinguished by identification information KI, which clearly identifies the remote control 3 or 4.

This produces the advantage that a "PLAY", "STOP", "FORWARD", control command SB always relates clearly to the active source device of the active data link and a "VOLUME UP", "MUTE", ... control command SB always relates to all active playback devices of the active data link D. The user therefore does not have to use the remote control to switch between the individual devices, wherein by means of one control device in each case only one data link D can be activated and subsequently the devices activated with the activated data link D can be controlled. This will be described in further detail with reference to exemplary embodiments.

Figures 2, 3:
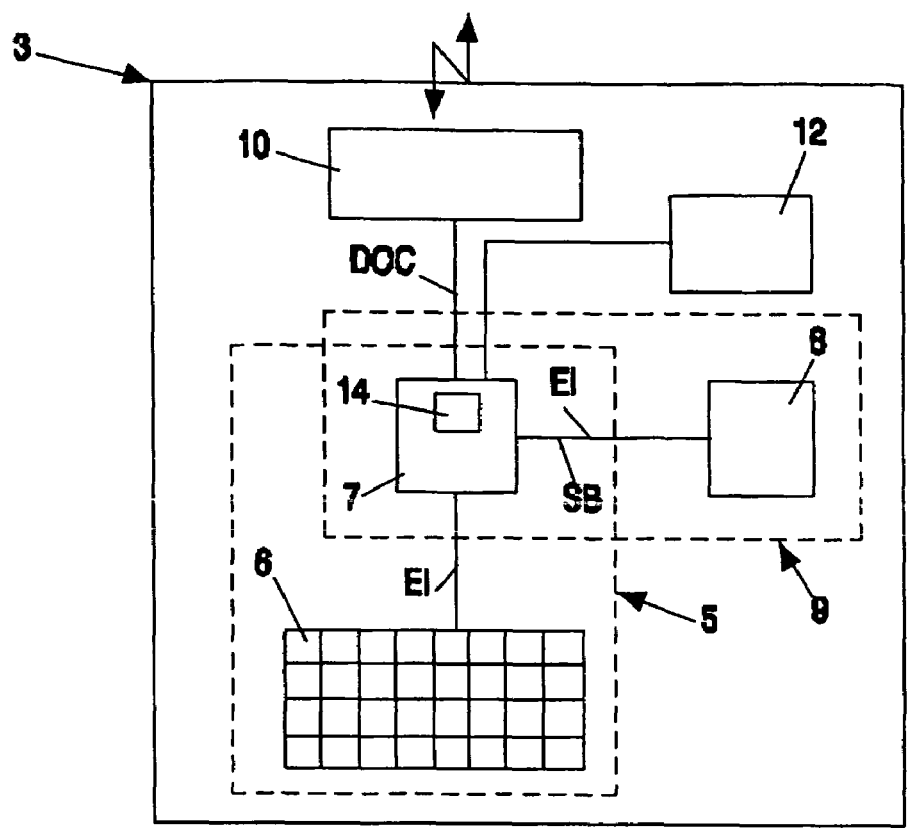
FIG. 2 shows the first remote control according to FIG. 1.
FIG. 3 shows an allocation table stored in memory means of the first remote control, which table stores input information and control commands allocated to one another.

The first remote control 3, which is of identical construction with the second remote control 4, is illustrated detail in FIG. 2. The first remote control 3 comprises input means 5, which are formed by a keypad 6 and a keypad readout program executed by a processor 7 of the first remote control 3. Each key of the keypad 6 is assigned a key code, which forms input information EI. When a user of the first remote control 3 operates, for example, the key T1 labeled "PLAY" in order to activate the playback operating mode in a source device, then the associated key information T1 is supplied as input information EI to the processor 7 and processed by the keypad readout program.

FIG. 3 illustrates an allocation table ZU, in which the input information EI is allocated to the control commands SB. The first remote control 3 comprises memory means 8 in which the allocation table ZU is stored. Processing means 9 of the first remote control 3 are formed by different programs (display activation program, encoding program, ... ) executed by the processor 7 and by the memory means 8. The processing means 9 are constructed inter alia to encode the entered input information EI and to output transmission information to transmission means 10.

The transmission means 10 are constructed for contactless communication of the transmission information in accordance with the known transmission method WLAN (Wireless Local Area Network Standard WiFi, IEEE 802.11a/b/g). According to the WLAN transmission method, a radio-frequency transmission is used, in which the transmission information sent with the transmission means 10 can be received throughout the house 1. Transmission means 11 corresponding to the transmission means 10 are connected to the computer PC and are designed to communicate with the transmission means 10.

Figure 4:
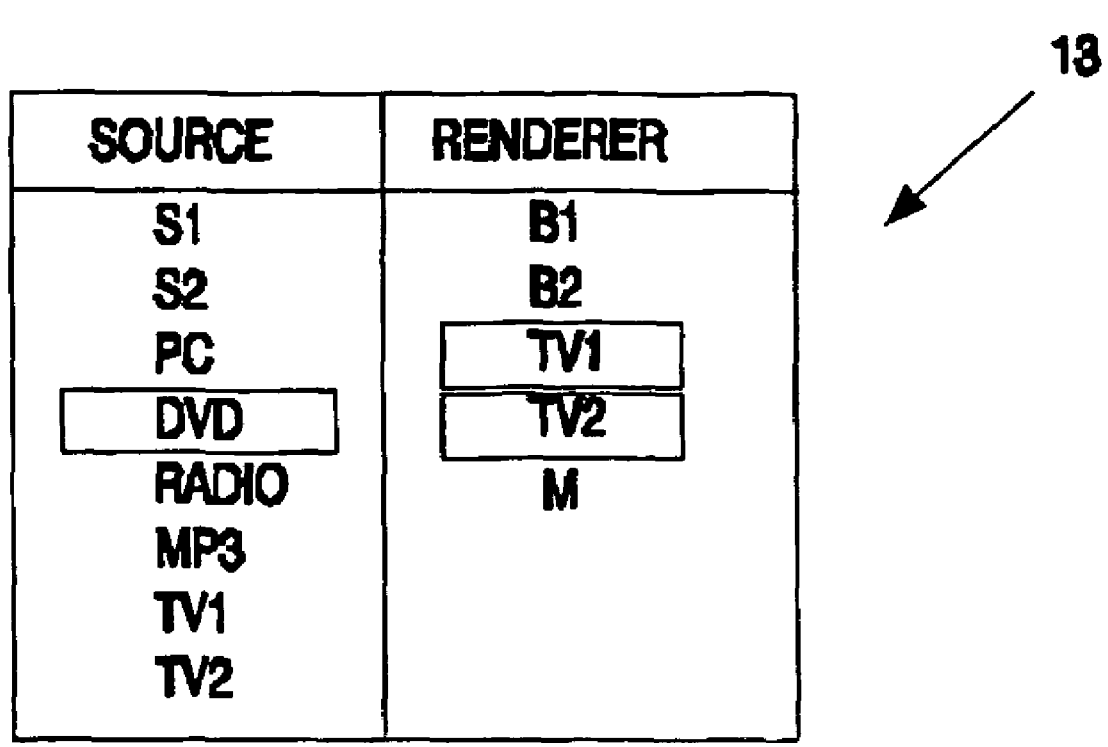
FIG. 4 shows a link table for display with a display of the first remote control, which table lists source devices and playback devices activatable for a data link.

The first remote control additionally comprises a display 12, with which inter alia a link table 13 shown in FIG. 4 can be displayed. The link table 13 lists all source devices and playback devices that are currently being passively controlled and consequently currently not linked into an active data link D. Further details of this are given from the following examples of application.

The processing means 9 now additionally comprise command-encoding means 14 for encoding the entered input information EI in accordance with a command-encoding method independent of the transmission method WLAN, a command document DOC being determined as transmission information and containing, in the form of text editable with a text editor, a control command SB allocated to the entered input information EI. The command document DOC is here formed by a so-called XML-document (Extended Markup Language). XML-documents are today already being used for the transmission of audio and video information from source devices to playback devices and are known to the expert in this context.

According to the invention, an XML-document for controlling source devices and playback devices is created in the first remote control 3 and subsequently transmitted with the transmission means, the XML-document containing the control command SB to be transmitted in the form of text editable with a text editor. It is especially advantageous here for the encoding of the control command SB in an XML-document to be independent of the chosen transmission method. The XML-document can thus be effected according to the WLAN transmission method, but also, for example, according to an infrared transmission method, a transmission method according to IEEE 1394 or a transmission method by way of a USB-data bus. In contrast thereto, the transmission of a "PLAY" control command SB with a conventional infrared remote control is dependent on the transmission method and the control command "PLAY" has to be decoded in the infrared receiver and encoded according to, for example, the IEEE 1394 command code if the "PLAY" control command is to be transferred onwards via a IEEE 1394 data bus.

According to the invention, the advantage is also obtained that the control command SB is contained in the form of text in the XML-document and that this text (e.g. PLAY or CHANNEL UP) is customary for control commands in the case of virtually all manufacturers and customers—like a standard—and can consequently be interpreted spanning manufacturers in all source devices and playback devices. Changing a control command SB assigned to a key or changing several control commands SB assigned to a key is therefore especially easy, as explained in detail in the following from the examples of application.

According to a first example of application, it is now assumed that a first user has set up with his remote control, the first remote control 3, an active data link D from the DVD-player DVD as source device via the computer PC to the second television set TV2 as playback device, and is watching a film. It is assumed further that a second user, who has the second remote control 4, wishes to play a film with the video recorder VCR and watch it on the first television set TV1. To do this, the second user operates a key of the second remote control to set up a further active data link D.

From the computer PC the second remote control 4 receives via the transmission means 11 and 10 the information that the DVD-player DVD and the second television set TV2 are already linked into an active data link D and which of the source devices and playback devices connected to the network are still passive and therefore available for the further active data link. The processing means 9 hereupon display the link table 13 on the display, the entries DVD and TV2 not being displayed for selection. The second user then selects the video recorder VCR as source device or source and the first television set TV1 as playback device or renderer. Corresponding information is transmitted to the computer PC, whereupon the video recorder VCR and the first television set TV1 are activated and a further active data link D is set up between these devices. This further data link D is associated with the second remote control 4 and can be deactivated again or changed only by this. This produces the advantage that inputs of the first user with the first remote control 3 do not disturb the second user as he watches the film being played on the first television set TV1.

All control commands SB input by the second user with the second remote control 4 that are relevant to source devices (e.g. PLAY, NEXT, STOP, FORWARD, . . . ) are now transmitted by the second remote control 4 identified for the video recorder VCR. Likewise, all control commands SB input by the second user with the second remote control 4 that are relevant to playback devices (e.g. VOLUME UP, CHANNEL UP, BRIGHTNESS UP, . . . ) are transmitted by the second remote control 4 identified for the first television set TV1. This produces the advantage that the user does not have to operate any additional keys to identify the device for which a control command SB is entered.

The clear allocation of the second remote control 4 to the further active data link D also produces the advantage that a plurality of so-called personalization features are rendered possible, without the user having to identify himself by entering a code assigned to him. One personalization feature that can be provided is, for example, that a specific menu control preferred by the second user is displayed with a specific background color, text color and menu navigation with the first television set TV1. Likewise, the films recorded for the second user with the video recorder VCR and filed in an archive system could be displayed directly. In this connection, the expert is familiar with a number of further possible personalization features.

If the second user now enters the control command "PLAY" by operating the key T1, then the command-encoding means 14 are constructed to create the following XML-document as command document DOC or transmission information, which contains the control command "PLAY" as text editable with a text editor.

```
<?xml version="1.0" encoding="iso-8859-1" standalone="no" ?>
<!DOCTYPE XML_Remote SYSTEM "XML_Remote.dtd">
<RC>
<device type="VCR" />
<command type="PLAY" />
</RC>
```

In the above XML-document, the video recorder VCR is thus identified as source device by choice information AI=VCR, for which the control command SB "PLAY" that follows in the XML-document is provided. It is now especially advantageous that the control command SB "PLAY" can be decoded independently of the manufacturer of the video recorder VCR and evaluated for activation of the playback operation mode, since the word "PLAY" is the common expression for this.

The opportunity now to adapt the first remote control 3 to the wishes of the first user is especially advantageous. For that purpose, by means of the transmission means 10 and 11 the user can transmit the XML-document created by the command-encoding means 14 for each key of the first remote control 3 to the computer PC, and edit it with a text editor. The user can here, for example, assign the control command "REWIND" to the key T1 by replacing the text "PLAY" in the XML-document by the text "REWIND" and storing the edited XML-document in the memory means 8 by means of the transmission means 10 and 11. Alternatively, however, it may be that a complete XML-document belonging to each key of the remote control 3 has already been stored.

Likewise, it is possible to accommodate two or more control commands SB in an XML-document. For example, the key T5 could be occupied with the combination of control commands for selecting the input for satellite receivers and for recording on a video recorder. A corresponding XML-document could appear as follows:

```
<RC>
    <device type="DVD" />
    <command type="PLAY" />
    <device type="VCR" />
    <command type="RECORD" />
</RC>
```

The corresponding XML-document could alternatively appear as follows:

```
<RC>
    <command>
        <device type="DVD" />
        PLAY
    </command>
    <command>
        <device type="VCR" />
        RECORD
    </command>
</RC>
```

The user is therefore able to adapt his remote control to his requirements especially easily and, for example, switch off all appliances at once. Likewise, a control command could be inserted in the XML-document in several languages or in several ways in order to allow decoding in a wide variety of devices. For example, both the control command "PLAY" and the control command "WIEDERGABE" could be inserted in the XML-document for activation of the playback operating mode in a playback device.

According to a further example of application, it is assumed that the second remote control 4 has no display, for which reason the link table 13 for determining the active data link D is shown with currently passive playback devices. It is further assumed that the first user has set up with the first remote control 3 an active data link D between the computer PC as source device and the first television set TV1 as playback device. When the second user with the second remote control 4 operates a key to set up the further active data link D, then the link table 13 is displayed with the second television set TV2 and the monitor M. Regardless of whether the second user is at that moment in front of the monitor M or the second television set TV2, he can now select the desired source device and playback device, whereupon the playback devices not selected are set to the passive state again. It is especially advantageous here that the first user is not disturbed as he watches his film.

To allow the user to make a choice, the first speaker box pair B1 and the second speaker box pair B2 as playback devices could reproduce the link table 13 acoustically. Likewise, the second remote control 4 could have a built-in loudspeaker for acoustic reproduction of the link table 13.

The first user can additionally activate a further playback device at any time to the data link D he has activated, or can deactivate an already active playback device. He will do this, for example, when he does not want to finish watching the film with the first television set TV1 but wants to switch to the second television set TV2.

It should be mentioned that each of the source devices and playback devices of the system 2 or even just some source devices and playback devices of the system 2 could also have transmission means for transmission of transmission data according to the WLAN transmission method or comparable transmission methods. By virtue of the identification information KI of the first remote control 3 or the second remote control 4 co-transmitted in the XML-document DOC and by virtue of the choice information AI co-transmitted in the XML-document DOC, which information identifies the device for which the control command SB is intended, each of the devices is able to process the received XML-document DOC correspondingly.

It should be mentioned that the complete XML-document DOC allocated to the control command SB or the input information EI can be stored in the memory means 8. In that case, however, it would not be possible for choice information AI to be contained in the XML-document DOC. It is likewise possible, as described above, for the command-encoding means 14 to assemble and hence encode the XML-document for a specific key T only after the key has been operated.

It should be mentioned that the transmission means 11 are provided as transmission means of all devices (source devices and playback devices) illustrated in FIG. 1. Consequently, the transmission means 11 could contain command-encoding means that decode the command document DOC for all devices and supply correspondingly addressed control commands SB to the respective device. On the other hand, each device could also have command-decoding means.

It should be mentioned that a plurality of independent active data links could also be set up with one control device, in order to control a plurality of devices activated to these active data links. In that case, however, the user would have to select in each case the active data link for which the control command is entered.

The invention claimed is:

1. A control device (3, 4) for controlling at least one device (PC, DVD, RADIO, MP3, TV1, TV2, B1, B2, TV1, TV2, M) having input means (5) for manual entering of input information (EI) associated with a control command (SB) for controlling the at least one device (PC, DVD, RADIO, MP3, TV1, TV2, B1, B2, TV1, TV2, M) and having processing means (9) for encoding the entered input information (EI) and for outputting transmission information (DOC) and having transmission means (10) for transmitting the transmission information in accordance with a transmission method to transmission means (11) of the device in order to activate the control command in the device, characterized in that the processing means (9) comprise command-encoding means (14) for encoding the entered input information (EI) in accordance with a command-encoding method independent of the transmission method, wherein a command document (DOC) is created as transmission information, which command document (DOC) contains, in the form of text editable with a text editor, a control command (SB) associated with the entered input information (EI).

2. A control device (3, 4) as claimed in claim 1, characterized in that the command document (DOC) is formed by a so-called XML-document.

3. A control device (3, 4) as claimed in claim 1, characterized in that the transmission means (10) are part of a so-called WLAN (WiFi, IEEE 802.11a/b/g).

4. A control device (3, 4) as claimed in claim 1, characterized in that the transmission means (10) are designed to receive a changed assignment of control commands (SB) to input information (EI) and in that memory means (8) are provided for the associated storage of the changed control commands (SB) and input information (EI).

5. A control device (3, 4) as claimed in claim 1, characterized in that the command document (DOC) contains text forming choice information (AI), which identifies the device that is to be controlled with the transmitted control command (SB).

6. A control device (3, 4) as claimed in claim 1, characterized in that memory means (8) are designed for storing identifying information (KI) identifying the control device (3, 4), the identifying information additionally being contained in the command document (DOC) for transmission of a control command (SB).

7. A control device (3, 4) as claimed in claim 1, characterized in that the control command (SB) is contained in at least two languages as text in the command document (DOC).

8. A system (2) for controlling at least one device (PC, DVD, RADIO, MP3, TV1, TV2, B1, B2, TV1, TV2, M) with at least one control device (3, 4), the control device (3, 4) having input means (5) for manual entering of input information (EI) associated with a control command (SB) for controlling the at least one device (PC, DVD, RADIO, MP3, TV1, TV2, B1, B2, TV1, TV2, M) and processing means (9) for encoding the entered input information (EI) and for outputting transmission information (DOC) and having transmission means (10) for transmitting the transmission information corresponding to a transmission method to transmission means (11) of the device in order to activate the control command (SB) in the device, characterized in that the processing means (9) comprise command-encoding means (14) for encoding the entered input information (EI) in accordance with a command-encoding method independent of the transmission method, wherein a command document (DOC) is created as transmission information, which command document (DOC) contains, in the form of text editable with a text editor, a control command (SB) associated with the entered input information (EI), and in that the at least one device (PC, DVD, RADIO, MP3, TV1, TV2, B1, B2, TV1, TV2, M) comprises command-decoding means for decoding the command document (DOC) to activate the control command (SB) in the device (PC, DVD, RADIO, MP3, TV1, TV2, B1, B2, TV1, TV2, M).

9. A system (2) as claimed in claim 8, characterized in that the command document (DOC) is formed by a so-called XML-document.

10. A system (2) as claimed in claim 8, characterized in that the transmission means (10) in the control device (3) and in the at least one device (PC) are part of a so-called WLAN (WiFi, IEEE 802.11a/b/g).

11. A control method for controlling at least one device (PC, DVD, RADIO, MP3, TV1, TV2, B1, B2, TV1, TV2, M) with at least one control device (3, 4), wherein the following steps are executed:

manual entering of input information (EI) associated with a control command (SB) at the control device (3, 4) for controlling the at least one device (PC, DVD, RADIO, MP3, TV1, TV2, B1, B2, TV1, TV2, M);

encoding of the entered input information (EI) and outputting of transmission information;

transmission of the transmission information in accordance with a transmission method to transmission means (11) of the device in order to activate the control command (SB) in the device, wherein the following further steps are executed, encoding the entered input information (EI) in accordance with a command-encoding method independent of the transmission method, wherein a command document (DOC) is created as transmission information, which command document (DOC) contains, in the form of text editable with a text editor, a control command (SB) associated with the entered input information (EI);

decoding the command document (DOC) in the device (PC, DVD, RADIO, MP3, TV1, TV2, B1, B2, TV1, TV2, M) in order to activate the control command (SB).

12. A control method as claimed in claim 11, characterized in that the command document (DOC) is formed by a so-called XML-document.

13. A control method as claimed in claim 11, characterized in that the transmission information is transmitted in accordance with a so-called WLAN (WiFi, IEEE 802.11a/b/g).

* * * * *